US010364720B2

(12) United States Patent
Crawford et al.

(10) Patent No.: US 10,364,720 B2
(45) Date of Patent: Jul. 30, 2019

(54) METHODS FOR INSERTING WIRES INTO A GASEOUS EMISSIONS TREATMENT UNIT

(71) Applicant: Advanced Technology Emission Solutions Inc., Toronto (CA)

(72) Inventors: Robin Crawford, Carlisle (CA); John Douglas, Brantford (CA)

(73) Assignee: ADVANCED TECHNOLOGY EMISSION SOLUTIONS INC., Toronto, Ontario (CA)

( * ) Notice: Subject to any disclaimer, the term of this patent is extended or adjusted under 35 U.S.C. 154(b) by 294 days.

(21) Appl. No.: 15/486,369

(22) Filed: Apr. 13, 2017

(65) Prior Publication Data

US 2017/0218816 A1    Aug. 3, 2017

Related U.S. Application Data

(63) Continuation-in-part of application No. 15/259,858, filed on Sep. 8, 2016, which is a continuation of
(Continued)

(51) Int. Cl.
*F01N 3/20* (2006.01)
*F01N 3/28* (2006.01)
(Continued)

(52) U.S. Cl.
CPC .......... *F01N 3/2013* (2013.01); *B01D 53/94* (2013.01); *F01N 3/2026* (2013.01);
(Continued)

(58) Field of Classification Search
CPC .......... Y10T 29/49345; Y10T 29/49776; Y10T 29/49398; F01N 3/2013; F01N 3/28; B23P 19/00; B23P 19/12; B23P 19/105
See application file for complete search history.

(56) References Cited

U.S. PATENT DOCUMENTS 3,779,710 A * 12/1973 Burstein ................ B01D 53/86
                                                                219/393
3,785,778 A *  1/1974 Burstein ................ B01D 53/34
                                                                126/299 R
(Continued)

FOREIGN PATENT DOCUMENTS

DE           10309862 A1 *  9/2004   ........... F01N 3/0222
EP            0577117 A2 *  1/1994   ......... B01D 53/9454

*Primary Examiner* — Patrick D Maines
(74) *Attorney, Agent, or Firm* — Stuart L. Wilkinson (57) ABSTRACT

A method is disclosed for loading elongate wire lengths into elongate cells of a honeycomb ceramic substrate unit for a gaseous emissions treatment assembly, the cells each having a small cross-sectional area, the area shape matching the cross-sectional shape of the loaded wire lengths and marginally greater in area size than the wire lengths. A wire length is formed with a generally pointed end tip by pulling adjacent parts of a wire along the wire axis respectively in opposite directions from a desired wire breakage site. The tension and timing of the pulling operation are selected so that a desired tip profile is achieved. Initial alignment is done using machine vision. Subsequent adjustment is effected in dependence on feedback from sensors mounted close to the end of a wire insertion arm. Breakage and push insertion of wires is done using alternating gripping and moving of chucks or collets which have aperture shapes close in profile to the outer profile of the wire lengths.

13 Claims, 6 Drawing Sheets

Related U.S. Application Data application No. 14/452,800, filed on Aug. 6, 2014, now Pat. No. 9,488,085.

(60) Provisional application No. 61/879,211, filed on Sep. 18, 2013, provisional application No. 61/910,067, filed on Nov. 28, 2013, provisional application No. 62/426,259, filed on Nov. 24, 2016.

(51) Int. Cl.
*B01D 53/94* (2006.01)
*H05B 6/10* (2006.01)

(52) U.S. Cl.
CPC ......... *F01N 3/2825* (2013.01); *F01N 3/2828* (2013.01); *H05B 6/108* (2013.01); *F01N 2240/05* (2013.01); *F01N 2330/06* (2013.01); *F01N 2330/30* (2013.01); *F01N 2510/00* (2013.01); *Y02T 10/26* (2013.01)

(56) References Cited

U.S. PATENT DOCUMENTS

| | | | | |
|---|---|---|---|---|
| 5,203,166 A | * | 4/1993 | Miller | F01N 3/021 55/466 |
| 5,355,671 A | * | 10/1994 | Maus | F01N 9/00 374/E7.021 |
| 5,731,562 A | * | 3/1998 | Beckmeyer | B01D 53/885 219/69.12 |

\* cited by examiner

METHODS FOR INSERTING WIRES INTO A GASEOUS EMISSIONS TREATMENT UNIT

CROSS REFERENCE TO RELATED PATENTS

The present application claims priority pursuant to 35 USC § 120 as a continuation-in-part of U.S. patent application Ser. No. 15/259,858 filed Sep. 8, 2016 entitled "Gaseous emissions treatment structures with induction heating" which is a continuation of U.S. patent application Ser. No. 14/452,800 filed Aug. 6, 2014 entitled "Catalytic converter structures with induction heating" which claims priority pursuant to 35 U.S.C. § 119(e) from U.S. provisional patent application 61/879,211, entitled "Catalytic converter employing electrohydrodynamic technology" filed Sep. 18, 2013 and from U.S. provisional application 61/910,067 entitled "Catalytic converter using field heating of metal component" filed Nov. 28, 2013. The present application further claims priority pursuant to 35 U.S.C. § 119(e) from U.S. provisional patent application 62/426,259, entitled "Methods for inserting wires in an induction heated gaseous emissions treatment unit", filed Nov. 24, 2016. The disclosures of the above-numbered applications are hereby incorporated herein by reference in their entirety and made part of the present application for all purposes.

FIELD OF THE INVENTION

This invention relates to methods for inserting wires in an induction heated gaseous emissions treatment unit and has particular but not exclusive application to such methods for use in the manufacture of catalytic converters, particulate filters (PFs) and like structures for treating exhaust gases to reduce harmful pollution.

BACKGROUND

The U.S. Department of Transportation (DOT) and the U.S. Environmental Protection Agency (EPA) have established U.S. federal rules that set national greenhouse gas emission standards. Beginning with 2012 model year vehicles, automobile manufacturers required that fleet-wide greenhouse gas emissions be reduced by approximately five percent every year. Included in the requirements, for example, the new standards decreed that new passenger cars, light-duty trucks, and medium-duty passenger vehicles had to have an estimated combined average emissions level no greater than 250 grams of carbon dioxide ($CO_2$) per mile in vehicle model year 2016.

Catalytic converters and particulate filters (PFs) are used in internal combustion engines to reduce noxious exhaust emissions arising when fuel is burned as part of the combustion cycle. Significant among such emissions are carbon monoxide and nitric oxide. These gases are dangerous to health but can be converted to less noxious gases by oxidation respectively to carbon dioxide and nitrogen/oxygen. Other noxious gaseous emission products, including unburned hydrocarbons, can also be converted either by oxidation or reduction to less noxious forms. The conversion processes can be effected or accelerated if they are performed at high temperature and in the presence of a suitable catalyst being matched to the particular noxious emission gas that is to be processed and converted to a benign gaseous form. For example, typical catalysts for the conversion of carbon monoxide to carbon dioxide are finely divided platinum and palladium, while a typical catalyst for the conversion of nitric oxide to nitrogen and oxygen is finely divided rhodium.

Catalytic converters and particulate filters have low efficiency when cold, i.e. the running temperature from ambient air start-up temperature to a temperature of the order of 300° C. or "light-off" temperature, being the temperature where the metal catalyst starts to accelerate the pollutant conversion processes previously described. Light-off is often characterized as the temperature at which a 50% reduction in toxic emissions occurs and for gasoline is approximately 300° C. Below light-off temperature, little to no catalytic action takes place. This is therefore the period during a vehicle's daily use during which most of the vehicle's polluting emissions are produced. Getting the catalytic converter or PF hot as quickly as possible is important to reducing cold start emissions.

U.S. Pat. No. 9,488,085 (Catalytic converter structures with induction heating) shows a catalytic converter assembly having a substrate body with a plurality of cells or passages extending along the body for the passage therethrough of exhaust gases. Metal as wires or filaments is located at predetermined locations in the substrate body and an electromagnetic field generator is mounted adjacent the substrate body for generating a varying electromagnetic field inductively to heat the metal and so heat the substrate body. By energizing the field generator inductively to heat the wires, the time to "light off"—the temperature at which the converter is hot enough to render exhaust emissions less toxic—is reduced.

SUMMARY OF THE INVENTION

According to one aspect of the invention, there is provided a method for loading elongate wire lengths into elongate cells of a honeycomb ceramic substrate unit for a gaseous emissions treatment assembly, the method comprising, forming lengths of the wire with generally pointed profile tips, aligning axes of the wire lengths with axes of respective selected ones of the cells, moving the wire lengths so that the tips project into ends of the respective selected cells, and moving the wire lengths to desired positions along the respective cells.

BRIEF DESCRIPTION OF THE DRAWING

For simplicity and clarity of illustration, elements illustrated in the accompanying figure are not drawn to common scale. For example, the dimensions of some of the elements are exaggerated relative to other elements for clarity. Advantages, features and characteristics of the present invention, as well as methods, operation and functions of related elements of structure, and the combinations of parts and economies of manufacture, will become apparent upon consideration of the following description and claims with reference to the accompanying drawings, all of which form a part of the specification, wherein like reference numerals designate corresponding parts in the various figures, and wherein:

DETAILED DESCRIPTION OF THE INVENTION INCLUDING THE PRESENTLY PREFERRED EMBODIMENTS

Figure 1:
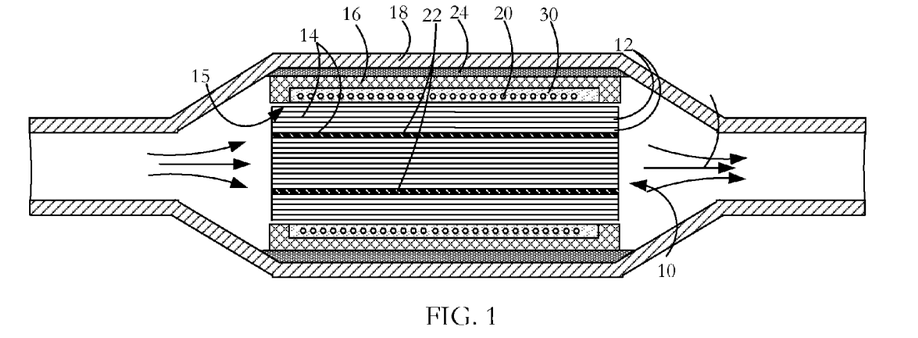
FIG. 1 is a longitudinal sectional view of a gaseous emissions treatment unit according to an embodiment of the invention.

A gaseous emissions treatment assembly may take any of a number of forms. Typical of these is a catalytic converter having a cylindrical substrate body 10 usually made of ceramic material and often called a brick, an example of which is shown in FIG. 1. The brick has a honeycomb structure in which a number of small area passages or cells 12 extend the length of the brick, the cells being separated by walls 14. There are typically from 400 to 900 cells per square inch (cpsi) of cross-sectional area of the substrate body 10 and the walls 14 are typically in the range 0.003 to 0.008 inches in thickness. Typically, the ceramic substrate body 10 is formed in an extrusion process in which green ceramic material is extruded through an appropriately shaped die and units are cut successively from the extrusion, the units being then cut into bricks. The areal shape of the cells or passages 12 may be whatever is convenient for contributing to the overall strength of the substrate body 10 while presenting a large contact area at which flowing exhaust gases can interact with hot catalyst coating layer 15 lining the interior walls of the cells. Catalyst particles are contained in a wash coat which is deposited onto the cell walls in the course of production. A suitable wash-coat contains a base material, suitable for ensuring adherence to the cured ceramic material of the substrate body, and entrained particulate catalyst material for promoting specific pollution-reducing chemical reactions. While the cell walls 14 are coated with a catalyst 15 if the assembly is to function as a catalytic converter, the walls may be either uncoated or coated if the assembly is to function as a particulate filter (PF).

Examples of such catalyst materials are platinum and palladium which are catalysts effective in converting carbon monoxide and oxygen to carbon dioxide, and rhodium which is a catalyst suitable for converting nitric oxide to nitrogen and oxygen. Other catalysts are known which promote high temperature oxidation or reduction of other gaseous materials. The wash-coating is prepared by generating a suspension of the finely divided catalyst in a ceramic paste or slurry, the ceramic slurry serving to cause the wash-coat layer to adhere to the walls of the ceramic substrate body. As an alternative to wash-coating to place catalyst materials on the substrate body surfaces, the substrate body material itself may contain a catalyst so that the brick presents catalyst material at the internal surfaces bounding the cells.

Exhaust gases from diesel (compression combustion) engines contain more nitrogen oxides than gasoline (spark combustion) engines. Long-term exposure to nitrogen oxides even at low levels can cause temporary or permanent respiratory problems. Selective catalytic reduction (SCR) is a method by which a liquid reductant is injected into a diesel engine exhaust flow to combine with nitrogen dioxide and nitric oxide (referred to collectively as $NO_x$) in the exhaust gas. A preferred reductant is aqueous urea $(2(NH_2)_2CO$ which is often referred to as diesel exhaust fluid (DEF). In the presence of a catalyst, ammonia resulting from thermal decomposition of the urea combines with the nitrogen oxides to produce less harmful products, chiefly nitrogen and water. Other reductants such as anhydrous ammonia and aqueous ammonia may also be used as an alternative to urea although especially for automotive application, on-board storage presents greater difficulty. Suitable catalysts may be any of certain metals oxides (such as those of molybdenum, vanadium, and tungsten), certain precious metals and zeolites. The typical temperature range for a SCR reaction is from 360° C. to 450° C. with a catalyst such as activated carbon being used to stimulate lower temperature reactions. As in gasoline (spark combustion engines), diesel (pressure combustion) engines may experience a period after a start-up where the exhaust temperature is too cool for effective SCR $NO_x$ reduction processes to take place. Other catalytic converters in which the present invention finds application for preheating or supplementary heating are lean NOX catalyst systems, lean NOX trap systems and non-selective catalytic reduction systems.

A gaseous emissions treatment assembly may have a series of the substrate bodies or bricks 10, each having a different catalyst layer depending on the particular noxious emission to be neutralized. Gaseous emissions treatment bricks may be made of materials other than fired ceramic, such as stainless steel. Also, they may have different forms of honeycombed cells or passages than those described above. For example, cells can be round, square, hexagonal, triangular or other convenient cross-sectional shape. In addition, if desired for optimizing strength and low thermal capacity or for other purposes, some of the extruded honeycomb walls 14 can be formed so as to be thicker than other of the walls, or formed so that there is some variety in the shape and size of cells 12. Junctions between adjacent interior cell walls 14 can be sharp angled or can present curved profiles.

Typically, as shown in FIG. 1, the wash-coated ceramic honeycomb brick 10 is wrapped in a ceramic fibrous expansion blanket 16. A stamped metal casing or can 18 transitions between the parts of an exhaust pipe (not shown) fore and aft of the gaseous emissions treatment unit so as to encompass the blanket wrapped brick. The casing 18 is typically made up of two parts which are welded to seal the brick in place. The expansion blanket 16 provides a buffer between the casing 18 and the brick 10 to accommodate their dissimilar thermal expansion coefficients. The metal of the sheet metal casing 18 expands much more than the ceramic material of the brick at a given temperature increase and, if the two materials were bonded together or in direct contact with each other, destructive stresses would be experienced at the interface of the two materials. The blanket 16 also dampens vibrations from the exhaust system that might otherwise damage the brittle ceramic of the substrate body.

In use, the encased brick (or bricks) is mounted in the vehicle exhaust line to receive exhaust gases from the engine and to pass them to the vehicle tail pipe. The passage of exhaust gases through the gaseous emissions treatment unit heats the ceramic brick 10 to promote catalyst activated processes where the flowing gases contact the catalyst layer. Especially when the vehicle engine is being run at optimal operating temperature and when there is substantial throughput of exhaust gases, such treatment units operate substantially to reduce the presence of noxious gaseous emissions entering the atmosphere. Such units have shortcomings however at start-up when the interior of the brick is not at high temperature and during idling which may occur frequently during city driving or when waiting for a coffee at a Tim Hortons drive-through.

Brick shape, profile and cell densities (i.e. cells per square inch) vary among different manufacturers. For example, some bricks are round and some are oval. Some assemblies have single stage bricks that are generally heavily wash-coated with the catalyst metals, while others may have two or three bricks with different wash-coatings on each brick. Some exhausts have 900, 600 and 400 cpsi cell densities used in the full exhaust assembly, while others use only 400 cpsi bricks throughout. A close-coupled converter may be mounted up close to the exhaust manifold with a view to reducing the period between start-up and light-off temperature. An underfloor catalytic converter can be located further from the engine where it will take relatively longer to heat up but be relatively larger and used to treat the majority of gases once the exhaust assembly is up to temperature. In another configuration, a unit for reducing the period to light-off temperature and a unit to deal with high gas flow after light-off are mounted together in a common casing.

At one or more locations in the assembly, sensors mounted in the exhaust gas flow including within or adjacent the substrate body provide feedback to the engine control system for emission checking and tuning purposes. Aside from start-up, control of fuel and air input has the object typically of maintaining a 14.6:1 air:fuel ratio for an optimal combination of power and cleanliness. A ratio higher than this produces a lean condition—not enough fuel. A lower ratio produces a rich condition—too much fuel. The start-up procedure on some vehicles runs rich for an initial few seconds to get heat into the engine and ultimately the catalytic converter.

Figure 2:
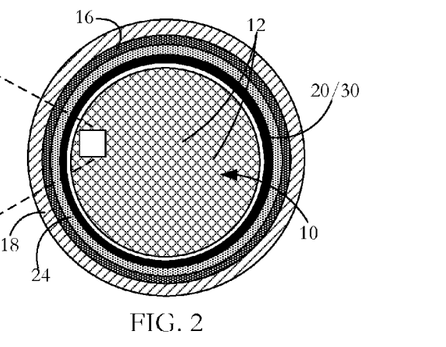
FIG. 2 is a cross-sectional view of the gaseous emissions treatment unit of FIG. 1.
Figure 3:
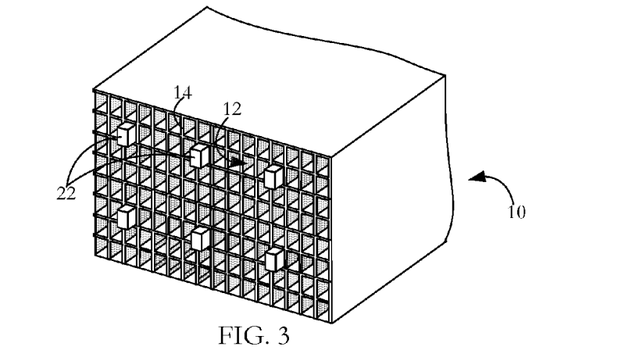
FIG. 3 is a perspective sectional view of a part of a gaseous emissions treatment unit according to an embodiment of the invention showing wires located in cells of a substrate body.

The brick 10 illustrated in the gaseous emissions treatment assembly of FIGS. 1 to 3 is modified to enable induction heating. Induction heating is a process in which a metal body is heated by applying a varying electromagnetic field so as to change the magnetic field to which the metal body is subject. This, in turn, induces eddy currents within the body, thereby causing resistive heating of the body. In the case of a ferromagnetic metal body, heat is also generated by a hysteresis effect. When the non-magnetized ferromagnetic metal is placed into a magnetic field, the metal becomes magnetized with the creation of magnetic domains having opposite poles. The varying field periodically initiates pole reversal in the magnetic domains, the reversals in response to high frequency induction field variation on the order of 1,000s to 1,000,000s cycles per second (Hz) depending on the material, mass, and shape of the ferromagnetic metal body. Magnetic domain polarity is not easily reversed and the resistance to reversal causes further heat generation in the metal.

As illustrated in FIGS. 1 and 2, surrounding the ceramic substrate body is a metal coil 20 and located within selected cells 12 are metal pins or wires 22 (FIGS. 1-3). By generating a varying electromagnetic field at the coil 20, a chain reaction is initiated, the end result of which is that after start-up of a vehicle equipped with an exhaust system embodying the invention, light-off may be attained more quickly in the presence of the varying electromagnetic induction field than if there were no such field. The chain reaction is as follows: the varying electromagnetic field induces eddy currents in the metal pins 22; the eddy currents cause heating of the metal elements; heat from the metal elements 22 is transferred to the walls 14 of the ceramic substrate; heat from the heated substrate body is transferred to exhaust gas as it passes through the converter and to the catalyst coating 15; and the heated exhaust gas and heated catalyst cause the catalytic reactions to take place more quickly compared to exhaust gas that has not been subjected to supplementary induction heating. Conduction from the heated wires 22 is the primary source of heat transfer to the ceramic substrate 10 and therefore to the exhaust gases when the converter is in operation. There is also a small amount of convective and radiated heat transfer at any small air gaps between a wire 22 and the interior surface of the cell 12 within which it is contained.

The coil 20 is a wound length of copper tube, although other materials such as copper wire or litz wire may be used. Copper tube is preferred because it offers high surface area in terms of other dimensions of the coil; induction being a skin-effect phenomenon, high surface area is of advantage in generating the varying field. If litz wire or copper wire is used, an enamel or other coating on the wire is configured not to burn off during sustained high temperature operation of the converter. An air gap between the coil 20 and the nearest inductance metal wires 22 prevents significant heat transfer from the wires 22 to the coil 10 which would otherwise increase the coil resistivity and so lower its efficiency.

A layer 24 of electromagnetic field shielding material is located immediately outside the coil 20 to provide induction shielding and to reduce induction loss to the metal converter housing. The shielding layer also acts to increase inductive coupling to the wires 22 to focus heating. The magnetic shield 24 can be made from a ferrite or other high-permeability, low-power-loss materials such as Giron, Magnet-Shield, Papershield, Finemet, CobalTex, or other magnetic shielding material that can be arranged to surround some or all of the windings of the coil 20. In particular, the magnetic shield 24 operates as a magnetic flux concentrator, flux intensifier, diverter, or flux controller to contain the magnetic fields within the substrate body. The magnetic shield lowers loss by mitigating undesirable heating of adjacent conductive materials. Without the magnetic shield, magnetic flux produced by the coil 20 could spread around the coil and link with the electrically conductive surroundings such as the metal casing 18 and other surrounding metal in an exhaust system, and/or other components of an internal combustion engine, vehicle, generator or other electrical system or host system, decreasing the life of these components and increasing energy loss. In addition, the magnetic shield 24 operates to direct the magnetic field to the substrate body 10 providing selective or enhanced heating of a desired region of the substrate body, for example, by redirecting magnetic flux that would otherwise travel away from that desired region. In particular, the magnetic shield can operate to concentrate the magnetic flux produced by the coil 20 in the direction of the metal wires or rods 22 in the substrate body 10 for more efficient heating. As an additional benefit, the magnetic shield can improve the electrical efficiency of the induction coil 20 by increasing power transfer.

The coil 20 is contained in a fiber insulation sheath with the sheathed coil being encased in a cast, cured insulation 30. The cast insulation functions both to stabilize the coil position and to create an air-tight seal to confine passage of the exhaust gases through the ceramic honeycomb substrate body 10 where catalytic action takes place. The insulation also provides a barrier to prevent the induction coil 20 from shorting on the converter can 18 or the ferrite shield 24. The insulation is suitable alumino-silicate mastic. In an alternative embodiment, the substrate body is wrapped in an alumino-silicate fiber paper. In one manufacturing method, the copper coil 20 is wrapped around the substrate body and then placed in the casing or can 18. In an alternative manufacturing method, the coil 20 is placed in the can 18 and the substrate body 10 is inserted into the coil/can assembly.

In operation, a varying electromagnetic induction field is generated at the coil by applying power from either a DC or AC source. Conventional automobiles have 12 VDC electrical systems. The induction system can operate on either DC or AC power supply. The induction signal produced can also be either DC or AC driven. For either DC or AC, this produces a frequency of 1 to 200 kHz, a RMS voltage of 130 to 200V and amperage of 5 to 8 A using 1 kw of power as an example. In one example suitable for road vehicles, a DC to DC bus converts the vehicle's 12 VDC battery power to the required DC voltage outlined above. In another example suitable for conventional road vehicles, a DC to AC inverter converts the vehicle's 12V DC battery power to the desired AC voltage outlined above. Another example is more suited to hybrid vehicles having both internal combustion engines and electric motors have on-board batteries rated in the order of 360V voltage and 50 kW power. In this case, the battery supply power is higher, but the same basic DC to DC bus or DC to AC inverter electrical configuration can be applied. An insulated gate bipolar transistor (IGBT) or metal-oxide-semiconductor field effect transistor (MOSFET) high speed switch is used to change the direction of electrical flow through the coil. In terms of the effect of a varying electromagnetic induction field on metal in the ceramic substrate body, a low switching frequency produces a longer waveform providing good field penetration below the surface of the metal element and therefore relatively uniform heating. However, this is at the sacrifice of high temperature and rapid heating owing to the lack of switching. In contrast, a high switching frequency produces a shorter waveform, which generates higher surface temperature at the sacrifice of penetration depth. Applied power is limited to avoid the risk of melting the metal elements. A suitable power input to a single brick coil is of the order of 1.1 kw.

Figure 4:
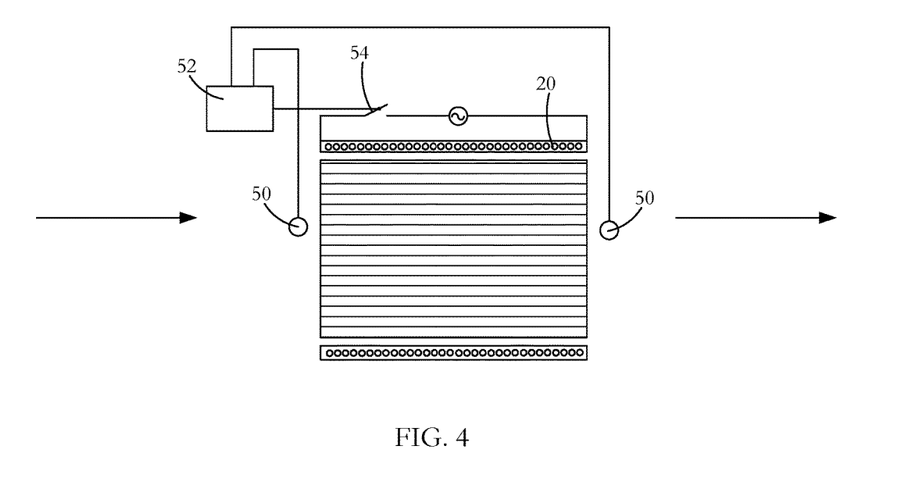
FIG. 4 is a schematic view of a control system a gaseous emissions treatment unit.
Figure 5:
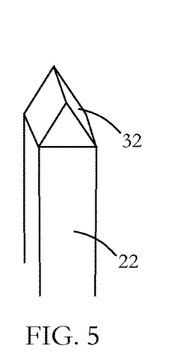
FIG. 5 is an isometric view of a wire end tip profile for facilitating insertion of wires into cells of a honeycomb ceramic substrate according to one embodiment of the invention.

The induction heating process may be applied before start-up or at any time during normal running of the power plant from which gaseous emissions emanate. As shown in the schematic view of FIG. 4, one or more temperature sensors 50 mounted in the catalytic converter are used to monitor temperature at any time and can be suitably deployed to monitor temperature at different locations in the catalytic converter or particulate filter. Outputs from the temperature sensors 50 are taken to a controller 52 at which the monitored temperature or temperatures are used to control through switch 54 the times at which the induction process is used. Using an appropriate algorithm implemented at the controller 52, the monitored temperatures may also be used to control specific effects of the applied induction heating process in implementations where the induction field characteristics are selectable to achieve a particular induction heating pattern. Structures and operating methods as described above for supplementary heating or preheating parts of a catalytic converter or particulate filter can be used with each of a close-coupled catalytic converter, an underfloor converter, or a combination of the two.

Figure 2A:
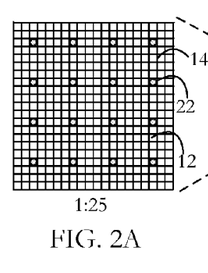
FIG. 2A is a detail view to a larger scale of a part of the treatment unit illustrated in FIG. 2.

As previously described, metal wires or rods 22 are located at selected locations of the ceramic substrate body 10 as shown in the detail cross-sectional view of FIG. 2A. While the wires are distributed in a symmetric pattern as shown, they may occupy an alternative distribution depending on a desired heating profile. Similarly to direct heating, all or some of the wires may not extend over the full length of the cells which they occupy. In a preferred structure, the wire outer profile and the cell inner profile are closely matched to maximize heat transfer from the inductively heated wires 22 to the walls 14 of the ceramic substrate 10. Nominally square section wires, in particular, provide good heat transfer to the square section cells due to high contact area between the two materials. Clearly, the cross-sectional area of the wire must be slightly smaller than that of the cell in order to permit wire insertion.

As previously indicated, the cross-sectional area of the cells 12 (also called passages) in the honeycomb ceramic substrate 10 are small and the wires 22 (also called rods or pins) are correspondingly small in cross sectional area. A suitable metal for the inserted wire is a ferromagnetic metal such as stainless steel grade 430 which has high magnetic permeability and corrosion resistance. Lower permeability alloys such as 300 or 400 series stainless steels may also be used. Alternative metals can be used depending on particular properties required in making the wire inserts and in fixing inserts within selected cells of the ceramic substrate. Such properties include metal formability, ductility, softness and elasticity. For shaping the direction and strength of magnetic flux in the substrate, lower magnetic permeability metals or alloys may be used for metal inserts in the outer cells with relatively higher magnetic permeability metals being used for metal inserts in the inner cells. Metals having very high magnetic permeability may also be used. For example, Kanthal iron-chrome-aluminum alloys used in wires manufactured by Sandvik have a relative permeability of 9000 and greater. High relative permeability can be achieved using wires made of other alloys including nickel-iron and iron-cobalt alloys. Non-metal conductors such as graphite may also be contemplated for use as the wire. The use of graphite obviates any need to compensate for differential expansion between the graphite rods and a honeycomb substrate made, for example, of cordierite because the coefficients of thermal expansion for graphite and cordierite are quite similar. Consequently, there is little stress build-up notwithstanding that the materials have in other respects markedly dissimilar properties. In terms of operational performance of a gaseous emissions treatment apparatus using this combination, high power levels can be maintained for longer times with graphite pins (compared with metal) as the curie temperature, at which ferromagnetic materials become paramagnetic and lose magnetism, is not a characteristic of graphite. The curie point is a limit of most magnetic metals and generally occurs between 650 and 700° C. Graphite can be heated to the allowable temperature limit of the ceramic substrate. However, in comparison with metal wires, more power is required for a given temperature as graphite has no magnetic hysteresis and has higher resistivity than ferromagnetic metals.

The insertion of wires is a delicate process almost like threading a needle. Greatest efficiency in heat transfer from heated wires 22 to the walls 14 of the substrate 10 is obtained using wires which are as close in cross-sectional shape and area to that of the passages as possible commensurate with being able to effect the threading process. Typically, the wire stock 34 is drawn to be from 0.002 inches to 0.005 inches less in width than the width of cells 12.

As shown in each of the embodiments of FIGS. 5 to 8, square cross-section wires are adopted for insertion into square cross-section cells. To facilitate wire insertion, leading ends 32 of the wires are configured with a wedge end (FIG. 5), a bullet end (FIG. 6), a flat faceted conical end (FIG. 7), a circular cross-section conical (pointed) end (FIG. 8) or similar end portion having a progressively reducing cross-section towards the wire tip. Configuring a wire with the pointed tips of any of FIGS. 5 to 8 at one or each end means that there is a small loss in heat transfer contact area between the wires 22 and the ceramic substrate walls 14 compared with the use of wire lengths with a blunt tip when the gaseous emissions treatment assembly is in operation. However, performance cost in such an assembly is negligible, even with relatively short lengths of wire of the order of 2 inches or less. In one embodiment, the extreme ends of the wire lengths are left flush with or just below the end face of the ceramic substrate 10. Alternatively, the wires are left protruding at the substrate input end if, for example, it is important to reduce operational back pressure by breaking up the exhaust gas waveform as the gas hits the unit and is stopped from entering the blocked cells.

Figure 6:
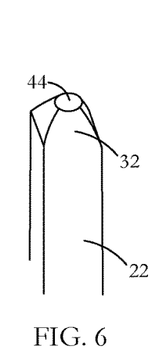
FIG. 6 is an isometric view of a wire end tip profile for facilitating insertion of wires into cells of a honeycomb ceramic substrate according to another embodiment of the invention.
Figure 7:
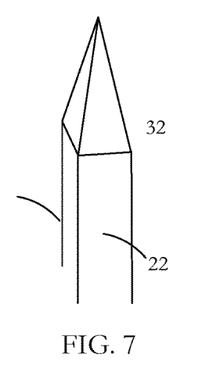
FIG. 7 is an isometric view of a wire end tip profile for facilitating insertion of wires into cells of a honeycomb ceramic substrate according to a further embodiment of the invention.
Figure 9:
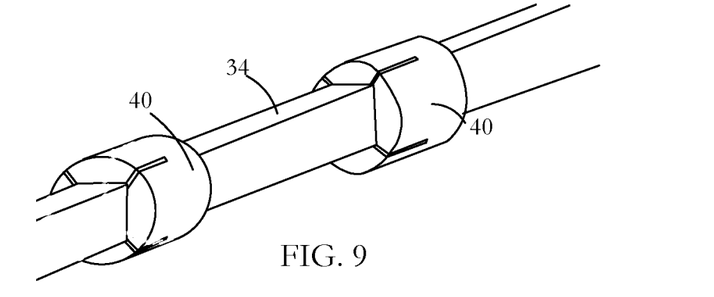
FIG. 9 is an isometric detail view showing a stage in the course of a manufacturing method according to an embodiment of the invention for inserting a wire into a cell of a ceramic honeycomb substrate.
Figure 10:
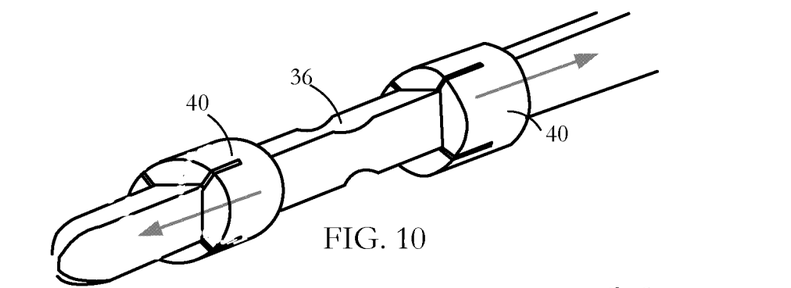
FIG. 10 shows a later stage in the manufacturing method referred to with respect to FIG. 9.
Figure 11:
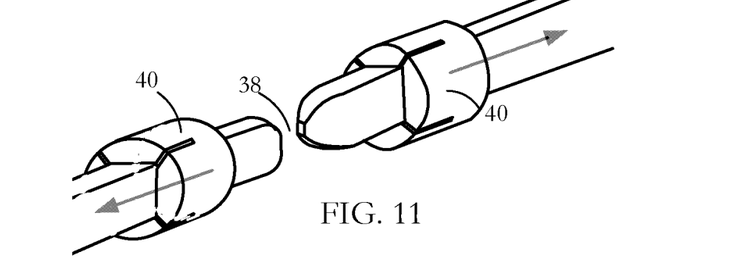
FIG. 11 shows a still later stage in the manufacturing method referred to with respect to FIG. 9.

With reference to FIGS. 9 to 11, in one method for obtaining the bullet shape end of FIG. 6, stock wire (FIG. 9) is pulled under tension sufficiently that the wire stock 34 first plastically deforms by necking 36 (narrowing of its cross-section at a defined point) (FIG. 10) before breaking 38 (FIG. 11) at a minimum sustainable cross-sectional area. In one example, a 0.026 inch square wire made of 430F stainless steel (for use in a 900 cells per square inch [cpsi] ceramic substrate) was subjected to a tension force of 0.2 kN (about 45 ft-lb). In another example, a 0.036 square wire made of the same steel (for use in a 400 cpsi ceramic substrate) was subjected to a tension force of 0.4 kN (about 90 ft-lb) to effect breaking.

Figure 8:
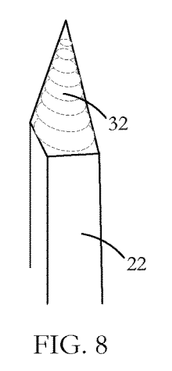
FIG. 8 is an isometric view of a wire end tip profile for facilitating insertion of wires into cells of a honeycomb ceramic substrate according to yet another embodiment of the invention.

To obtain a desirable wire end profile without distorting the shape of neighboring parts of the wire, the wire is clamped using collets that are positioned very close to, and either side of, the intended break site. In one example, collets 40 were positioned of the order of 1 millimeter apart, with one clamp stationary and the other clamp driven. The close clamp proximity ensures that the necking and breaking occur over a very small length of the wire. An applied lateral clamping force is selected so as not to exceed the yield strength of the wire because an excess clamping force would otherwise cause wire deformation with the risk of both width increases, making it harder or impossible to thread wires, and width decreases, which would mean, in operation of the finished, deployed product, reduced heat transfer between the wire and the adjacent substrate cell walls. Using collets to grip the square wire evenly over substantially the full perimeter extent of the four sides ensures maximum overall grip given a particular force applied against the side. The rate of tensioning is typically 1 m/s or less and is chosen so that the necking and breaking processes have sufficient time to develop. Near-instantaneous tensioning is not preferred as it limits the time for necking/thinning and leads to breaking that gives a blunt end profile instead of the desired bullet-shape. In an alternative embodiment, in the course of pulling a wire to break it, the wire is twisted. Twisting causes the bullet shape to become somewhat more conical, i.e. pointed, with straighter inclined sides near the break compared with the bullet shape of an untwisted break (FIG. 8). In addition, twisting generally provides a cleaner break at the extreme tip end. In other embodiments of the invention, profiles can be obtained by cutting and then modified by grinding (FIGS. 5 and 7) once cutting is completed.

Figure 16:
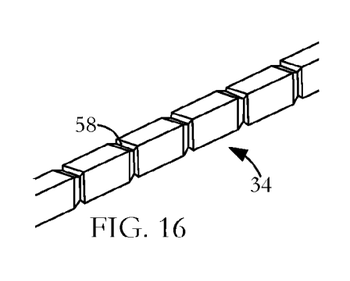
FIG. 16 shows wire stock prepared for us in a wire insertion method according to an embodiment of the invention.
Figure 17:
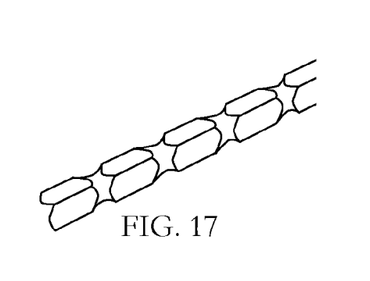
FIG. 17 shows another form of wire stock prepared for us in a wire insertion method according to an embodiment of the invention.

In an embodiment of the invention, stock wire 34 is modified during wire production or before forming the individual wires 22 so as to assist in the development of a desired end profile when the stock wire is subsequently broken or cut. In one modification as shown in FIG. 16, the square section wire 34 is scored along each side with a generally V-section score line 58 so as to clearly define a break plane and to begin the reducing formation at the end of the wire. The break line can alternatively be formed by stamp deformation of the wire provided that subsequent breaking removes any enlargement of the wire section at the break site. An alternative embodiment of pre-formed stock wire is shown in FIG. 17.

Figure 12:
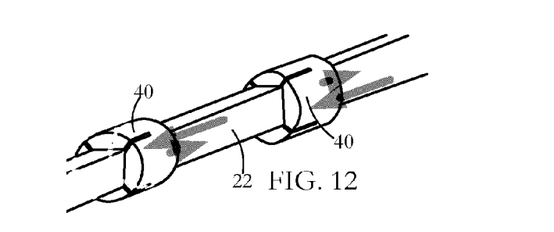
FIGS. 12 and 13 are isometric views illustrating phased movement of collets to effect wire breaking and subsequent insertion of wires into cells of a ceramic substrate according to an embodiment of the invention.
Figure 13:
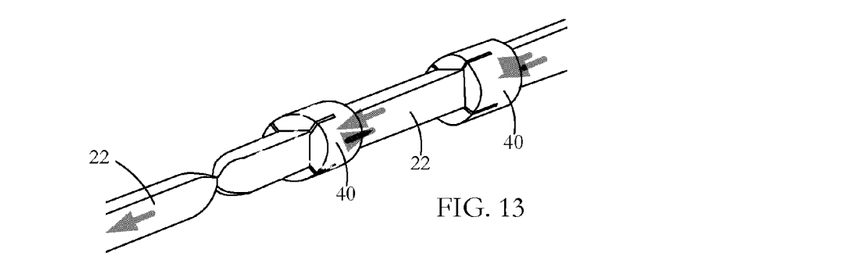
Figures 14, 15:
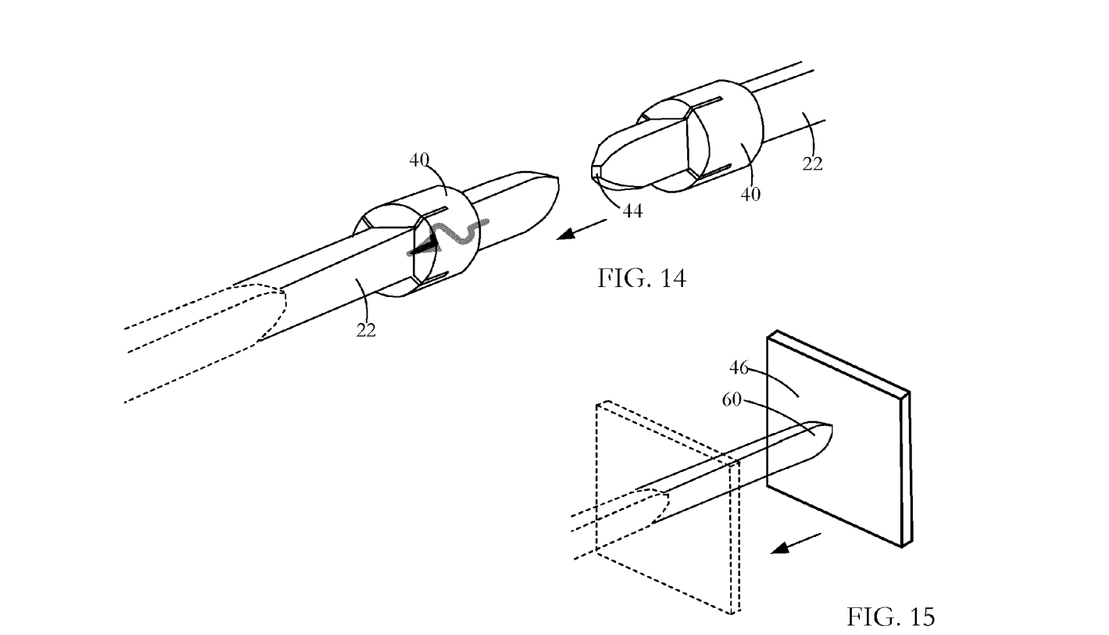
FIG. 14 is an isometric view illustrating phased movement of collets to effect fast insertion and subsequent pushing of wires into cells of a ceramic substrate according to an embodiment of the invention.
FIG. 15 is an isometric detail view showing a stage in the course of a manufacturing method according to an embodiment of the invention for inserting a wire into a cell of a ceramic honeycomb substrate.

Once a wire 22 with reduced ends 32 is formed, it is inserted into a selected cell. With reference to FIGS. 12 and 13, in one technique for inserting a wire 22 into and along a cell 12, a collet 40 forming part of an automatic insertion machine (not shown) is used to insert and push the wire 22 most of the way along the cell or along part of the cell if the wire is a segment intended to occupy only part of the cell length (FIG. 12). The collet 40 is then released and moved back from the substrate to a position where a next wire 22 for insertion is gripped and used to push the immediately prior-inserted wire to its final position (FIG. 13). Subsequently, either or both of the substrate and the insertion machine are adjusted to line them up for a next wire insertion. As shown in FIGS. 6 and 14, the bullet tip has a small flat spot 44 where the break occurs. In the push insertion method illustrated in FIGS. 12 and 13, respective wire flat spots are lined up to enable the required pushing action. The technique can be used to push the previously inserted wire so that its trailing end is beyond the input end of the ceramic substrate if it is desired to sink the inserted wire beyond the substrate end.

In another insertion technique as illustrated in FIG. 14, a wire 22 is inserted into a cell at a relatively high speed with the wire gripping collet 40 being released after a desired length of insertion is completed. The momentum of the moving wire carries it some distance further depending on frictional forces presented by the cell walls as the wire travels along them. This can be a relatively imprecise method because of the variation in reactive forces experienced by the moving wire and so a subsequent placement operation will normally be required using a push wire 22.

In another technique as illustrated in FIG. 15, a push-in fixture 46 on an automatic insertion tool is deployed. The push-in fixture 46 is positioned over the protruding tail end 60 of a partially inserted wire after a collet used to partially insert the wire is released. The push-in fixture 46 is then moved against the ceramic substrate surface to drive the wire to its finish position.

Figure 20:
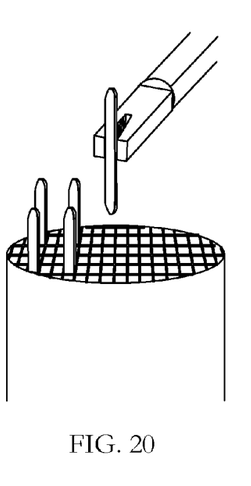
FIGS. 20 to 22 are perspective views showing stages in a batch loading and locating of metal wires into ceramic substrate according to an embodiment of the invention.
Figure 21:
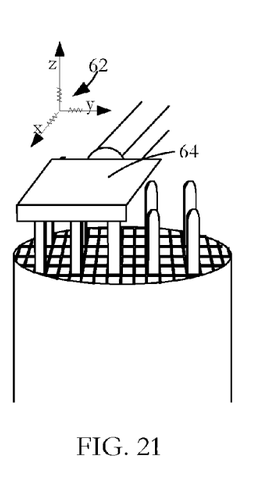
Figure 22:
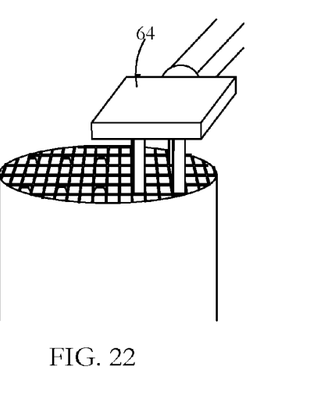

In a variation as shown in FIGS. 20 to 22, a block insertion method is used simultaneously to push a group of partially inserted wires into respective cells. Partial insertion (FIG. 20) ensures proper alignment to facilitate a subsequent push-in step. A high frequency vibration 62 is applied to a push-in plate 64 to allow the wires individually to adjust during push-in even though the motion of the push-in plate 64 does not adjust for any individual wire. The vibration allows the wire to self-centre by shifting and twisting as necessary and as transmitted to the wire by its interaction with the cell walls to find and follow the easiest path for further wire insertion into the cell. The vibration also ensures the wire heads are not locked against the face of the push-in plate 64. FIGS. 20 to 22 show a z-axis push-in motion with vibration in x, y and z axes.

In a variation, several pins or wires are inserted simultaneously into selected cells of the ceramic substrate. To achieve this, a lower face of an insertion plate such as the plate 64 shown in FIG. 21 is formed with an array of pin housings, the array corresponding to an array of substrate cells selected for pin insertion. Wires to be inserted are loaded into the insertion plate and are held there as the insertion plate is orientated so that the wires have their tips close to respective ones of the cells into which they are to be inserted. In one embodiment, the wires are magnetically suspended in the insertion plate. In another embodiment, a robotic gripper is used in which retention holes in the insertion plate are adjustable, firstly to grip the wires in an x, y plane and then to release the wires after they have been placed in the selected cells by z axis movement of the insertion plate.

In a further embodiment, an insertion head has two collets 40 spaced from each other along the axis of wire stock and the collets and the wire supported by them are subjected to out-of-phase movements successively to effect wire breaking and wire-to-wire push cycles.

Figure 23:
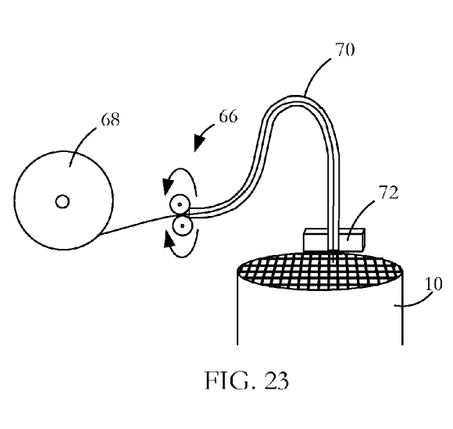
FIG. 23 is a perspective view showing delivery of metal stock wire to a ceramic substrate, the breaking of the stock wire into lengths, and the loading of wire lengths into the substrate according to an embodiment of the invention.
Figure 24:
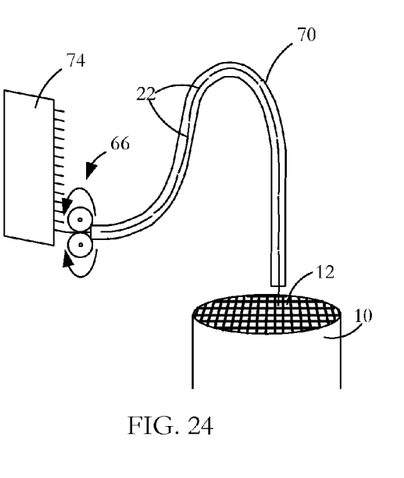
FIG. 24 is a perspective view showing delivery of wire lengths from a magazine to a ceramic substrate and the loading of the wire lengths into a ceramic substrate according to an embodiment of the invention.

For wires of different cross section, such as a circular or triangular section, a correspondingly apertured collet or chuck is used so as evenly to distribute gripping force around the wire. Although a collet or chuck is preferred, a wire feed, such as that generally characterizing MIG welding machines may alternatively be used as shown in FIGS. 23 and 24. In one method as shown in FIG. 23, a set of opposed counter-rotating rollers 66 feeds wire stock 34 continuously from a reel 68 and through a guide 70 to the face of the ceramic substrate 10. The wire is cut to length by a cutter or breaker head 72 adjacent the input end of the ceramic substrate 10. The head 72 can for example use a pair of phased motion collets such as those illustrated in FIG. 12 to effect breaking. In an alternative method as shown in FIG. 24, prepared wire lengths 22 are used. The wire lengths 22 are pushed through a wire guide 70 with each wire length pushing the wire length in front. Motive force to a trailing one of the tandem lengths is provided by counter-rotating rollers 66 and the guide 70 is positioned so that the leading wire length is directed down into the corresponding selected cell 12. A cutter/breaker is either positioned at the roller pair or the wire lengths are directed from a magazine 74 into the delivery mechanism. In a further alternative, wire lengths stored in a magazine are picked and placed into the cells of the ceramic substrate using robot grippers.

The reduced wire tip profiles of FIGS. 5 to 8 provide value in the process of inserting wires into the cells of the ceramic substrate, whether that process is done by hand or using an automated insertion machine. Although initial guidance of a wire length 22 relative to the substrate cell 12 into which it is to be inserted is done by machine vision, optimal alignment between the small section wire and cell is hard to achieve and may depend on more factors than just the tip of the wire and the position of the call opening. The wire end reduced profiles 32 shown in FIGS. 5 to 8 permit a small error in alignment without inhibiting wire entry into a cell 12. The cross-section of the reduced profile tip provides a tolerance between perfect alignment and the minimum amount of alignment necessary to avoid damaging the delicate ceramic substrate 10 while still ensuring that the wire goes into the cell. The pointed, wedge or bullet tip provides both an initial guide into the cell opening and a subsequent guide as the wire moves along the cell. The latter is of value if there are deviations from surface planarity of the cell walls 14 or there are rough or high patches in a catalyst coating 15 applied to the cell walls.

Pushing the wire further into a cell requires a certain insertion force based on the difference between the wire size and cell size. Spikes in the required insertion force generally indicate an issue with the shape, size or positioning of the wire and/or the selected cell of the ceramic substrate.

Figure 18:
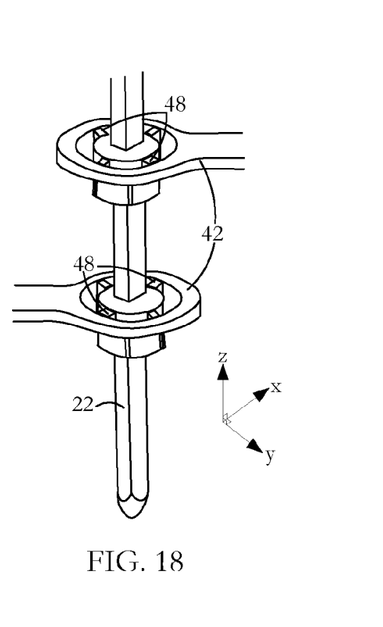
FIG. 18 is an isometric view showing a wire insertion structure with sensors for use in a method of wire invention according to an embodiment of the invention.

Referring to FIG. 18, in one embodiment, damage is avoided by sensing such a spike with sensors 48 mounted in the end of a wire insertion arm 42 or in a drive to the insertion arm (not shown). Sensors in the insertion arm 42 close to the insertion aperture are preferred because it is easier and more accurate to obtain direct readings than to have to factor in information related to and derived from movement of the robotic drive system. The sensors 48 can include any or all of the following:

a) Linear force sensors for measuring along the x axis
b) Linear force sensors for measuring along the y axis c) Linear force sensors for measuring along the z axis
d) Torsional force sensors for measuring force (moment) about the x axis
e) Torsional force sensors for measuring force (moment) about the y axis
f) Torsional force sensors for measuring force (moment) about the z axis A force limit is set for each sensor, the limit being the minimum force likely to cause damage to the wire or ceramic substrate less an added safety tolerance. In response to feedback from the sensors as a wire is inserted, minute adjustments in the insertion action are made in order to limit and/or reduce the detected force(s). These may be translational movements and/or rotation of the wire about its axis. If the force(s) cannot be sufficiently reduced and all possible corrective actions have been exhausted, an insurmountable problem is assumed. In that case, the particular cell location is abandoned or the part (wire or substrate) is rejected. Fill rules are adopted which determine what alternative cells can be used and what alternative fill arrays and fill levels are permitted in order that the finished unit will operate as desired in induction heating the substrate.

Certain insertion issues are more common and therefore sensor location and output processing may be adopted just for the more common faults. Insertion resistance in the linear force sensor for the z axis (i.e. direction of insertion) is the most common issue. In this situation, the wire may be apparently well aligned but does not go easily into the cell and a monitored spike in the required insertion force triggers corrective action. The z-axis excess force normally arises from a bow or kink in the wire, a bow in the ceramic, or, for a catalytic converter unit, an over-thick coated region of the deposited catalyst washcoat on one or more walls of the selected cell. Insertion resistance in the torsion force sensor for the z axis is a slightly less common issue where the centres of the cell and wire are aligned but, for a nominally square section wire and cell, the square faces of either the wire or cell are askew. The torsion force builds up as the tip enters the cell and the full perimeter profile tries to mate with the cell perimeter. The torsion sensor detects the direction of the force and a control change is generated to twist the wire and so compensate and reduce the torsion force. Insertion resistance in the linear force sensor for the x or y axis normally results from the wire having a bow in it, the bow being straightened as the wire is inserted. The straightening action causes lateral forces to act on the part of the wire still outside the ceramic. A similar effect results from a wall of the cell having a bow extending along its length.

In response to outputs from the sensors, the placement arm is adjusted to reduce the force load below a set limit. Insertion forces are monitored on an ongoing basis so that trends indicating a potential quality problem are identified and corrected. The sensors are located between the wire holding collet or chuck and a link fixture between the insertion arm and the robotic drive. Having the sensors as close to the end of the insertion arm as possible commensurate with the presence of the set(s) of jaws/chucks or other feeding mechanism provides the greatest assurance of accurate and precise measurement. In the case of a collet drive, the collet is concentric with the wire/pin so corresponding forces are generally balanced. The collet also has low mass which makes the required pin insertion force proportionately higher and more accurately measurable.

Figure 19:
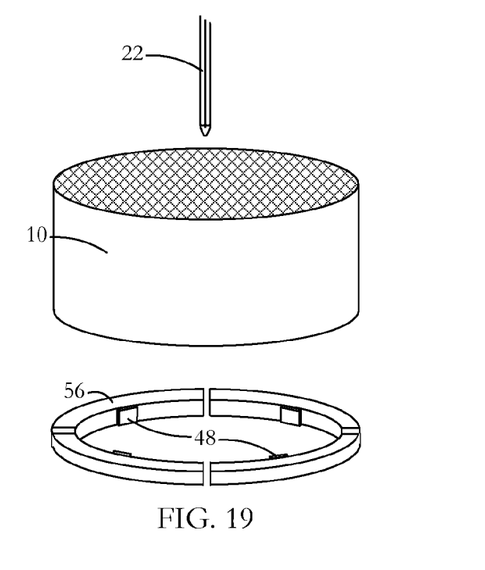
FIG. 19 is an isometric view showing another wire insertion structure with sensors for use in a method of wire invention according to an embodiment of the invention.

Referring to FIG. 19, in an alternative embodiment, the ceramic substrate 10 and a sensor ring 56 are mounted on a platform. The sensor ring has x-sensors and y sensors. Any movement of the substrate by progressive insertion of a wire is sense and the position and/or orientation of the table is adjusted accordingly. The z-axis sensor, as in the FIG. 18 embodiment is on the insertion arm.

In each of the above instances, the previously described insertion methods can be adopted with appropriate adjustments in the methods to accommodate the use of the particular wire profile and configuration. Other variations and modifications will be apparent to those skilled in the art and the embodiments of the invention described and illustrated are not intended to be limiting. The principles of the invention contemplate many alternatives having advantages and properties evident in the exemplary embodiments.

What is claimed is:

1. A method for loading elongate wire lengths into elongate cells of a honeycomb ceramic substrate unit for a gaseous emissions treatment assembly, the method comprising, forming lengths of the wire with generally pointed profile tips, aligning axes of the wire lengths with axes of respective selected ones of the cells, moving the wire lengths so that the tips enter into ends of the respective selected cells, and pushing the wire lengths to desired positions within the respective cells;
   monitoring a reactive force acting on a wire length as it is inserted into a respective cell and, on the basis of the monitored reactive force, adjusting insertion conditions to limit or reduce the reactive force; and
   wherein the monitoring of the reactive force is effected using a sensor mounted near a leading end of a wire length insertion arm or in a drive to the insertion arm.

2. The method of claim 1, the wire lengths formed from a reel of wire.

3. The method of claim 1, the tips being one of conical, chisel, pyramid and bullet profile.

4. The method of claim 1, the wire lengths formed by tensioning a start wire at a breaking zone to a level beyond the break point of the wire.

5. The method of claim 4, further comprising tensioning the start wire using two separated chucks configured to grip and to break the start wire by moving the chucks apart.

6. The method of claim 5, the chuck pressure on the start wire being below a level at which lateral material deformation of the start wire results at the chuck sites.

7. The method of claim 5, further comprising setting a distance separation of the chucks so that a desired amount of necking results in the start wire before breakage occurs, whereby to tailor the tip profiles.

8. The method of claim 5, further comprising using a leading one of the chucks to push the wire length gripped thereby after breakage into the cell with which it is axially aligned.

9. The method of claim 8, further comprising using a trailing one of the chucks and a part of the start wire gripped thereby to push a previously separated wire length along a cell.

10. The method of claim 1, the sensor being a sensor for detecting one of a reactive force along one of the x, y and z axes, and one of a torsion force (moment) about one of the x, y and z axes, where the z axis is the axis of alignment.

11. The method of claim 1, wherein the adjusting of insertion conditions to limit or reduce the force is a translation movement of one of the wire length and the substrate.

12. The method of claim 1, wherein the adjusting of insertion conditions to limit or reduce the force is a rotational movement of one of the wire length and the substrate.

13. The method of claim 1, the cells and the wire being of generally uniform cross-sectional area and shape, the area size and shape of the cells matching and marginally greater than the area size and shape of the wires.

* * * * *